(12) United States Patent
Nakamoto et al.

(10) Patent No.: US 6,277,468 B1
(45) Date of Patent: Aug. 21, 2001

(54) PAPER LAMINATED METAL SHEET

(75) Inventors: Tadashige Nakamoto; Hideki Nakamura, both of Kakogawa; Takeshi Kii; Noboru Kishida, both of Chiyida-ku; Koji Ishimoto, Kitakyushu; Mitsuo Ikeda, Souwa, all of (JP)

(73) Assignee: Mitsui Bussan Construction Materials Co., LTD, Tokyo-To (JP)

( * ) Notice: Subject to any disclaimer, the term of this patent is extended or adjusted under 35 U.S.C. 154(b) by 0 days.

(21) Appl. No.: 09/269,171

(22) PCT Filed: May 21, 1998

(86) PCT No.: PCT/JP98/02252

§ 371 Date: May 13, 1999

§ 102(e) Date: May 13, 1999

(87) PCT Pub. No.: WO99/04969

PCT Pub. Date: Feb. 4, 1999

(30) Foreign Application Priority Data

| Jul. 24, 1997 | (JP) | 9-198624 |
| Jul. 24, 1997 | (JP) | 9-198625 |
| Mar. 13, 1998 | (JP) | 10-63751 |
| Mar. 13, 1998 | (JP) | 10-63752 |

(51) Int. Cl.[7] .................................................... B32B 3/00
(52) U.S. Cl. .................... 428/156; 428/172; 428/173; 428/158; 428/161; 428/106; 428/151; 428/204; 428/464; 428/537.5; 428/542.2; 428/187
(58) Field of Search .................................... 428/172, 173, 428/156, 158, 161, 106, 151, 204, 464, 537.5, 547.2, 187

(56) References Cited

U.S. PATENT DOCUMENTS

| 4,009,319 | * | 2/1977 | Cline | 428/424 |
| 4,942,084 | * | 7/1990 | Prince | 428/284 |

FOREIGN PATENT DOCUMENTS

| 59-40115 | 9/1984 | (JP) . |
| 61-3652 | 2/1986 | (JP) . |
| 6-91806 | 4/1994 | (JP) . |
| 6-270334 | 9/1994 | (JP) . |
| 7-256822 | 10/1995 | (JP) . |
| 7-266526 | 10/1995 | (JP) . |
| 8-39748 | 2/1996 | (JP) . |
| 8-134799 | 5/1996 | (JP) . |

* cited by examiner

Primary Examiner—William P. Watkins, III
(74) Attorney, Agent, or Firm—Oblon, Spivak, McClelland, Maier & Neustadt, P.C.

(57) ABSTRACT

The present invention provides a paper-laminated metal sheet having a structure in which at least one sheet of paper is laminated on at least one side of a metal plate via a pressure sensitive adhesive agent or an adhesive agent layer, and a protective layer is formed on a top surface of the paper-laminated side. With this structure, the paper-laminated metal sheet can be processed without wetting the paper with water, while thereby preventing the paper from being torn. In addition, the aesthetic appearance derived from the paper is kept for a long period of time. Due to high strength and processability derived from the metal base material, and high aesthetic appearance unbelievable for a metal plate derived from the paper, the paper-laminated metal sheet is valuable in various applications as a novel material.

11 Claims, 2 Drawing Sheets

(a)

(b)

PAPER LAMINATED METAL SHEET

TECHNICAL FIELD

The present invention relates to a paper-laminated metal sheet including a metal base material and paper laminated on the metal base material. Specifically, the present invention relates to a paper-laminated metal sheet with high aesthetic appearance which has various applications including construction materials for houses and buildings such as inner wall materials, floor materials, ceiling materials, interior materials, panels, and doors, casing members for furniture such as lockers, cabinets, and counters, casing members for electric appliances, interior materials for vehicles such as cars, trains, and ships, and vessels and metal fixtures.

BACKGROUND ART

In an attempt to provide metal sheet on which aesthetic appearance can be made, various techniques have been developed, and the following methods have been in the actual use. In one method, a resin coating is applied to the surface of a plated or non-plated metal base material. After that, beautiful colors, designs or patterns may be printed thereon. As a result, a beautifully coated metal sheet is obtained. In another method, a metal base material is subjected to hot rolling, and a black oxide layer naturally formed during the hot rolling is utilized to make designs thereon. There is also a method for providing a steel sheet or a titanium alloy sheet formed with decorative coatings in various colors. In this method, an oxide layer of navy blue or other colors is artificially formed onto the surface of the metal base material. The metal sheets obtained in these conventional methods have beautiful and aesthetic appearance formed; however, a coolness and touch feel inheriting from metal sheets remain.

On the other hand, film-laminated metal sheets are also known. The film-laminated metal sheets are formed by laminating a film of polyvinyl chloride, polyolefin, or an acrylic resin onto a metal base material. The laminated films are effective in giving high corrosion resistance and scratching resistance to the metal sheets; however, few of them have aesthetic appearance property. In addition, these laminated films are thermoplastic in applications where the processability is important, and therefore, they have low heat resistance. As laminated films, vinyl polyvinyl chloride films have been widely used; however, they generate harmful gas when burned, causing an air-pollution problem.

In order to solve the above-described problems of the prior arts, studies have been proceeded to develop a new type of laminated metal sheets. For example, Japanese Unexamined Patent Publication No. 7-256822 discloses a paper-laminated metal sheet including a metal base material and paper laminated on the metal base material via an adhesive agent. The features of this invention seem to reside in that, when the paper-laminated metal sheet is subjected to a bending process, the portion to be bent is wet -with water and then is bent, thereby preventing the paper from being torn. However, the step of wetting the portion to be bent of the paper-laminated metal sheets one by one makes the production process complicated, and lowers the productivity. In addition, whereas the wet paper-laminated metal sheet can easily bent, the strength of its paper is lowered. As a result, a problem arises in that the paper is damaged or torn during the processing. There is also a problem that, in the state of being wet with water, the paper loses its adhesiveness to the metal base material. Depending on the processings, the paper may peel off from the metal base material.

The present invention has been achieved in view of the above-described situation, and an objective thereof is to provide a paper-laminated metal sheet which can be processed without wetting with water, while preventing the paper from being torn with, and which keeps the aesthetic appearance derived from the paper for a long period of time.

Another objective of the present invention is to provide a paper-laminated metal sheet with high strength and processability derived from the metal base material, as well as unbelievably high aesthetic appearance for a metal plate derived from paper, whereby the paper-laminated metal sheet is valuable as a novel material having various applications.

DISCLOSURE OF INVENTION

According to the present invention, a paper-laminated metal sheet has a structure in which at least a sheet of paper is laminated on at least one side of a metal base material via a pressure sensitive adhesive agent or an adhesive agent layer, and a protective layer is formed on the top surface of the paper-laminated side. With this structure, the paper-laminated metal sheet has a soft and warm touch derived from the paper while eliminating an inorganic appearance and a cold touch inherent to metals. In addition, the protective layer prevents the paper from being damaged during the time when the paper-laminated metal sheet is processed or is used for products. In addition, when the pre-printed paper is used, higher aesthetic appearance is attained. For example, when paper printed with a woodgrain pattern is used, the metal plate is valuable in various applications as a novel material with high quality appearance.

BEST MODE FOR CARRYING OUT THE INVENTION

Figure 1:
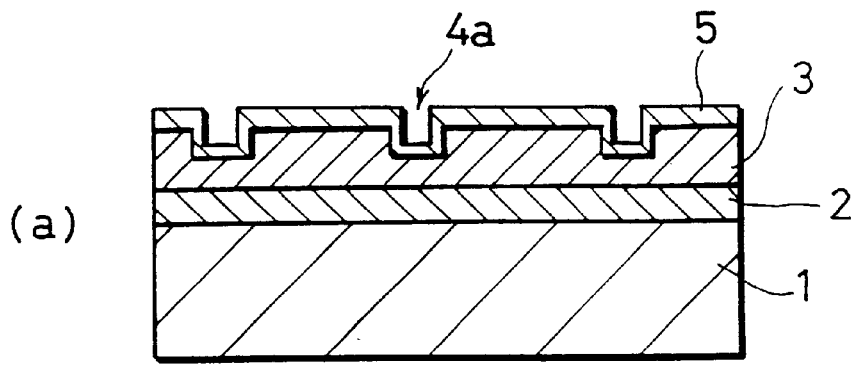
FIG. 1(a) is a cross-sectional view of a paper-laminated metal sheet according an example of the present invention.
FIG. 1(b) is a cross-sectional view of a paper-laminated metal sheet shown in FIG. 1(a) from which the protective layer is omitted.
Figure 1:
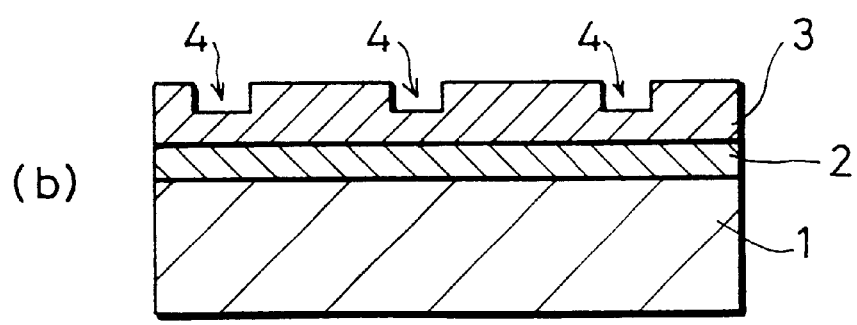

A paper-laminated metal sheet of the present invention has a structure in which at least a sheet of paper is laminated on at least one side of a metal base material via a pressure sensitive adhesive agent or an adhesive agent layer, and a protective layer is formed on the top surface of the paper-laminated side.

The protective layer preferably is a water-repellent resin film, and specifically, a water-repellent resin film having a water contact angle of 60 degree or more measured by a liquid drop method at 23° C. The protective layer with water repellency prevents the paper from being torn, and also avoids water penetration through the paper to protect the metal base material from corrosion by water.

In the paper-laminated metal sheet of the present invention, the peel strength at 180 degree between the metal base material and the paper laminated on the metal base material preferably is in the range between 0.01 to 5.0 kgf/10 mm in width, and the peel strength preferably is smaller than the breaking strength of the paper itself. In addition, it is preferable to use paper having a maximum elongation of 2% or more. The paper-laminated metal sheet, which satisfies these preferable requirements has high processability. Therefore, the paper-laminated metal sheet eliminates the step of wetting paper which makes the processing complicated and makes the protection of the paper from damage difficult.

The paper preferably is decorative paper having depressions and/or protrusions on its surface, and the depressions and/or the protrusions have colors different from the surrounding portions to form a visually recognizable design. Especially preferable is decorative paper having a structure in which at least a printing ink layer and a resin layer is formed on a paper base material, and the depressions and/or the protrusions are formed on the surface of the resin layer. Through the use of the decorative paper with this structure, various designs can be made by the printing ink layer, and the depressions and/or the protrusions of the resin layer create a three-dimensional effect on the design.

When decorative paper printed with a woodgrain pattern is used, the paper-laminated metal sheet is valuable in various applications as a novel material with high quality appearance. More preferably, the resin layer of the decorative paper has depressions to be dark-colored portions of the woodgrain pattern. In this case, the woodgrain pattern of the decorative paper resembles to a natural wood in appearance. From this point of view, the decorative paper preferably has the follow structure. On the entire surface of a base paper material, a first printing ink layer to be light-colored portions of the woodgrain pattern is formed directly or via another layer. Next, a second printing ink layer to be dark-colored portions of the woodgrain pattern is formed, and then, a resin layer containing a curing agent is formed on the first and second printing ink layers. The second printing ink layer is formed using ink including a compound which reacts with the curing agent of the resin layer to generate gas. The gas creates bubbles in the resin layer at least the portions positioned on the second printing ink layer, and the bubbles foam and bulge the resin layer. The whole of the foamed portions of the resin layer are ground and removed (i.e. hollowed out) to form depressions of which bottoms coincide with the top surface of the second printing in layer. Instead of the compound which generates gas through the reaction with the curing agent of the resin layer, a compound which decomposes and generates gas through the application of heat may be used to foam and bulge the resin layer.

The paper-laminated metal sheet of the present invention are typically used for construction materials, casing members for furniture and electric appliances, and interior materials for vehicles and ships. It should be noted, however, that the paper-laminated metal sheet is not limited to these applications, but may be used in other applications.

Hereinafter, the present invention will be further described in detail. As described above, the paper-laminated metal sheet of the present invention has a structure in which paper is laminated on at least one side of the metal base material, and a protective layer is formed on the top surface of the paper-laminated side. The paper-laminated metal sheet has a warm touch derived from the paper which is a natural material, and also has high processability and strength derived from the metal base material.

The metal base material is in the form of plate (sheet) made of metal, and is not limited to a specific kind. The examples thereof include steel sheets, copper sheets, aluminum sheets, titanium sheets, and various alloy sheets. Before the paper is laminated, the metal base material may be subjected to known surface treatments for giving corrosion resistance. The thickness of the metal base material is properly determined in accordance with the intended use of the paper-laminated metal sheet. Metal foil also may be used as the metal base material.

The paper used in the present invention is paper produced by intertwining and agglutinating plant fibers or other fibers into the form of sheet. The thickness and the basis weight of the paper is properly determined in accordance with the intended use of the paper-laminated metal sheet. In general, the paper preferably has the basis weight of 15 to 200 g/m$^2$. Also employable is paper which is printed with any patterns or is subjected to physical processings such as embossing, crepe processing, corrugating processing, and calendering processing in its production. Also preferable is printed paper such as decorative paper used for decorating wooden construction materials and wooden furniture. In addition, various kinds of decorative paper such as woodgrain paper, imitation leather, and papers printed through known printing processes also may be used. When paper formed with a protective layer on its entire surface beforehand is used as the paper of the present invention, there is no need of newly forming another protective layer. In this case, by just laminating the paper formed with the protective layer on the metal base material, the paper-laminated metal sheet of the present invention can be obtained. When the special decorative paper which will described later is used, higher aesthetic appearance is attained.

The paper preferably has a maximum elongation of 2% or more, in order to give high processability to the paper-laminated metal sheet. If the paper has the maximum elongation of less than 2%, the paper is easily torn during the processing. The paper preferably has the breaking strength larger than the peel strength at 180 degree (which will be described later) between the paper and the metal base material. The breaking strength (kgf/10 mm in width) and the maximum elongation (%) are measured in the state where the sample piece is pulled at a speed of 1mm/min at an atmosphere temperature of 23° C. and a humidity of 80%.

The paper-laminated metal sheet has a structure in which the paper is laminated on at least one side of the metal base material, and on the top surface of the paper-laminated side (one or both sides of the metal base material), a protective layer is formed. The protective layer is formed on the paper directly or via another layer before or after the paper is laminated on the metal base material. "Another layer" is not specifically limited. In order to perfectly protect the paper, the thickness of the protective layer preferably is 5 μm or more, but is not required to be excessive. In general, the thickness is 10 to 30 μm.

The protective layer preferably has water-repellency. Especially preferable as the protective layer is a water-repellent resin film which has a water contact angle of 60 degree or more measured by a liquid drop method at 23° C. The protective layer with water repellency prevents the paper from being torn and contaminated by water-based liquid, and avoids water penetration through the paper to protect the metal base material from corrosion by water.

The contact angle was measured by a liquid drop method in which water droplets were formed on the sample piece of the protective layer, and the contact angle of the droplets were measured at an atmosphere temperature of 23° C., using a CD-DT . A-type contact angle meter manufactured by Kyowa Kaimen Kagaku Co., Ltd.

Examples of the material for forming the protective layer include polyorefin resins, silicone resins, fluorine resins, polyurethane resins, epoxy resins, alkyd resins, acrylic resins, polyester resins, and vinyl acetate resins. Resins containing chlorine atoms such as polyvinyl chloride and polyvinylidene chloride are not suitable in the present invention, because these resins generate harmful gas when burned. In the present invention, the "resin" may include water, organic solvent, and other known additives such as curing agents, curing catalysts, viscosity thickners, wet property modifiers, plasticizers, and fillers in accordance with necessity.

The method for forming the protective layer is not specifically limited, and the following methods may be employed, for example. In one method, the resin for forming the protective layer is applied on the paper directly or via another layer by a method such as roll coating, spray coating, nozzle coating, dip coating, and bar coating. The applied resin is heated and dried to form the protective layer. The resin may be any of aqueous type (i.e. emulsion type), solvent type, and non-solvent type. In another method, the film made of the resin is laminated on the paper using an adhesive agent (which will be described later) if necessary, by a method such as dry laminating, wet laminating, and hot melt laminating. There is also a method in which the resin in the molten state is directly extruded through a die onto the paper and the like.

The paper is laminated on the metal base material via a pressure sensitive adhesive agent or an adhesive agent (hereinafter, simply referred to as an adhesive agent for the sake of convenience). The adhesive agent is directly applied onto the metal base material, or a film made of the adhesive agent is laminated on the metal base material. The method for applying the adhesive agent is not specifically limited, and the same methods as used for forming the protective layer may be employed. Examples of the adhesive agent include: vinyl acetate resins such as polyvinyl acetate and an ethylene-vinyl acetate copolymer (EVA); acrylic resins such as a poly(meth)acrylate and/or esters thereof or a copolymer of (meth)acrylate and/or esters thereof and other monomers such as styrene and vinyl acetate; polyurethane resins; polyester resins; polyorefin resins; polystyrene resins such as SBS and SIBS; rubbers such as natural rubber and synthetic rubber; and other know adhesive agents. The adhesive agent may be any of emulsion type, solvent type, and non-solvent type.

The amount of the adhesive agent is 0.5 to 40 g/m$^2$ as the weight per area after being dried. If the amount is less than 0.5 g/m$^2$, the adhesion between the paper and the metal base material becomes weak. Contrary to this, if the amount is larger than 40 g/m$^2$, wrinkles are created on the paper, and the adhesion effect is saturated. More preferable lower limit of the amount of the adhesive agent is 3.0 g/m$^2$, and more preferable upper limit thereof is 15 g/m$^2$.

After the adhesive agent is applied, the paper is laminated thereon. When the adhesive agent includes a solvent, the paper is preferably laminated on the adhesive agent layer before the solvent is completely dried. When the adhesive agent has a fluidity through the application of heat or is a thermosetting adhesive agent, the paper is preferably laminated on the adhesive agent layer before the adhesive agent is solidified and loses its fluidity. The adhesive agent with fluidity penetrates into the paper through its minute openings, and increases the adhesiveness of the paper. However, in the case where the paper has thin thickness and small basis weight, the adhesion agent may too deep penetrate into the paper, and exudes to the surface of the paper (i.e. to the surface on the side opposite to the metal base material). In order to avoid this trouble, the timing of laminating the paper is properly determined taking into consideration the drying and solidifying speed of the adhesive agent. After the paper is laminated, it is preferable that the paper-laminated metal sheet is passed through a hot air drying equipment to completely drying and curing the adhesive agent. The same cares as those described above are preferably taken in the formation of the protective layer.

The peel strength at 180 degree between the paper and the metal base material attached to each other via the adhesive agent layer is preferably in the range between 0.01 to 5.0 kgf/10 mm in width, and the peel strength is smaller than the breaking strength of the paper itself. The paper-laminated metal sheet of the present invention, which satisfies these requirements, can be processed without wetting the paper with water while preventing the paper from being torn. It is recommended that the kinds of the adhesive agent and the paper are properly selected so that these requirements are satisfied.

If the peel strength at 180 degree is smaller than 0.01 kgf/10 mm in width, the adhesion of the paper to the metal base material becomes weak. The paper may peel off with time. The peel strength at 180 degree of larger than 5.0 kgf/10 mm is not preferable as well, because the adhesion of the paper to the metal base material becomes too strong. In this case, the paper cannot resist being deformed in the processing, and may be torn. More preferable peel strength at 180 degree is in the range between 0.1 to 0.5 kgf/10 mm. The peel strength at 180 degree is measured by "the peeling test at 180 degree" in conformance with Japanese Industrial Standards (JIS) Z 0 237 at a peeling speed of 200 mm/min at an atmosphere temperature of 23° C. and a humidity of 80%.

The number of paper is not limited to one, but two or more sheets of paper may be used. When two or more sheets of paper are used, the adhesive agent is applied on the first paper, and then the second paper is laminated thereon. The second paper (i.e. the paper laminated on the first paper and positioned on the opposite side of the metal base material) may be partially cut. In this case, the lower paper is seen through the cut portion of the upper paper.

By laminating a plurality of partially-cut papers having different colors from each other, the paper-laminated metal sheet exhibits beautiful appearance. The protective layer is formed on the top paper.

In order to give higher aesthetic appearance to the paper-laminated metal sheet, special decorative paper may be used. For example, the decorative paper may be formed with depressions and/or protrusions on its surface, and the depressions and/or the protrusions have different colors from the surrounding portions to form a visually recognizable design. The depressions and/or the protrusions are preferably arranged to coincide with the pattern to be printed. Thus-formed design has a three-dimensional effect, and gives high aesthetic appearance to the decorative paper.

Figure 2:
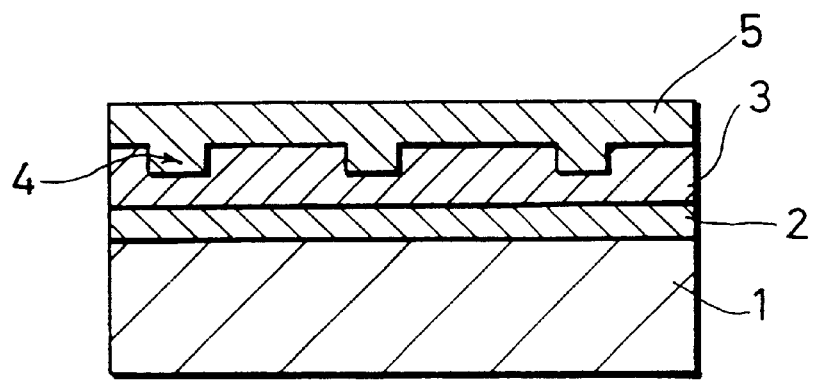
FIG. 2 is a cross-sectional view showing a paper-laminated metal sheet according to another example of the present invention.

FIG. 1(*a*) is a cross-sectional view showing a paper-laminated metal sheet including a decorative paper formed with depressions and protrusions to create a three-dimensional effect. FIGS. 1(*b*) is a cross-sectional view of the paper-laminated metal sheet of FIG. 1(*a*) from which the protective layer is omitted. On one side of a metal base material 1, decorative paper 3 is laminated via an adhesive agent layer 2, and a protective layer 5 is further formed on the decorative paper 3. Depressions 4 formed on the decorative paper 3 are left as depressions 4*a* after the formation of the protective layer 5 formed on the decorative paper 3. FIG. 2 is a cross-sectional view showing a paper-laminated metal sheet according to another example where depressions 4 are completely filled with a protective layer 5. In the present invention, any of these structures are employable; however, preferable is the structure shown in FIG. 1(a) where the depressions are left as the depressions 4a, in order to keep high aesthetic appearance derived from the decorative paper. Therefore, it is preferable that the depressions of the decorative paper is not completely filled with the protective layer. To this end, it is recommended that proper arrangements are made in the formation of the protective layer, for example, the protective layer is made into thin thickness.

The recommended method for producing the decorative paper having the depressions and protrusions which correspond to the pattern to be made such as those described above is as follows. First, a printing ink layer is formed on a paper base material which is the decorative paper, and then, a resin layer is formed thereon. After that, the depressions and protrusions are formed in the resin layer.

In order to form the depressions and protrusions corresponding to the printing pattern to be made in the resin layer, the following methods may be employed:

(1) On the paper base material, the printing ink layer is partially formed, and a resin (i.e. coating) layer is formed thereon. The ink used for forming the printing layer contains a compound which reacts with the curing agent contained in the resin layer and generates gas. The gas turns bubbles in the resin layer, and the parts of the resin layer which positioned on the printing ink layer, is foamed and bulged by the bubbles, consequently protrusions are formed (Japanese Unexamined Patent Publication No. 47-329 11).

(2) In the same manner as the above method (1), the printing ink layer generates gas which turns bubbles in the resin layer. The gas turns bubbles in the resin layer, and the parts of the resin layer which positioned on the printing ink layer, is foamed and bulged by the bubbles, consequently protrusions are formed (Japanese Unexamined Patent Publication No. 47-32911). Then, the whole of the protrusions are ground to form depressions in such a manner that the top surface of the second printing ink layer is exposed to outside to be the bottoms of the depressions (Japanese Unexamined Patent Publications Nos. 48-674 and 48-777).

(3) In the same manner as the above method (2), the depressions are formed in the resin layer, except that the ink layer is made of the ink containing "a compound which is decomposed through the application of heat to generate gas", instead of "the compound which reacts with the curing agent of the resin layer to generate gas" (Japanese Unexamined Patent Publication NO. 63-77571).

Figure 3:
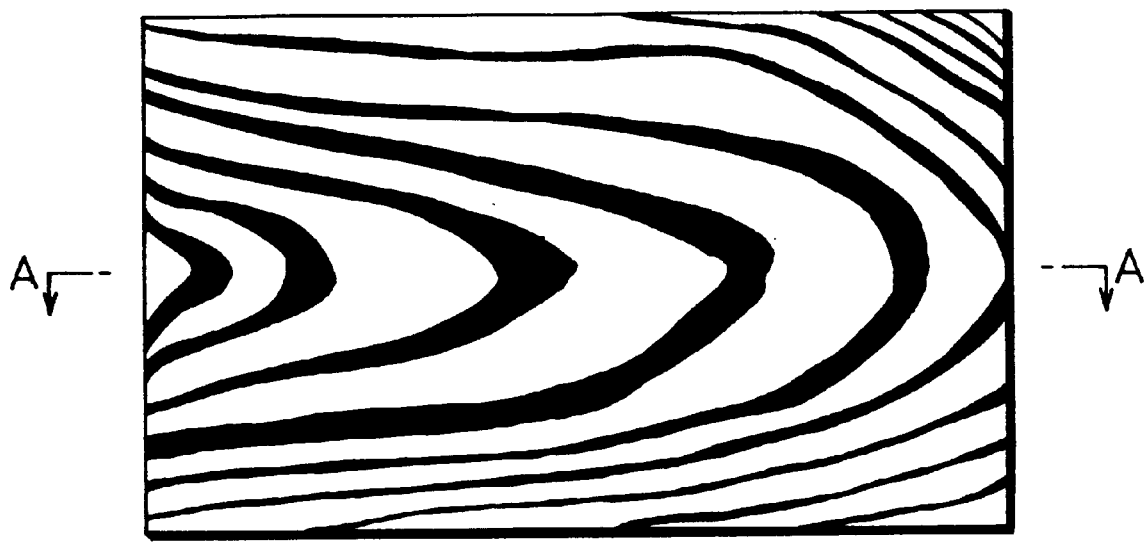
FIG. 3 is a plane-view of decorative paper on which a woodgrain pattern with a three-dimensional effect is printed.

Hereinafter, the terms "the three-dimensional patterns" and "depressions and protrusions corresponding to printed patterns" will be described, taking decorative paper having "a woodgrain pattern" as an example. FIG. 3 is a diagram showing an example of the woodgrain pattern. The woodgrain pattern has annual rings of wood, and specifically, is observed in a flat wooden board. In the decorative paper shown in FIG. 3, the actual color of the black-colored portion is dark brown, and the actual color of the white-colored portion is light brown. In the present invention, the terms "the three-dimensional patterns" and "depressions and protrusions corresponding to the printed patterns" mean that the depressions form the black-colored portion of the woodgrain pattern when the cross-section of the decorative paper is viewed (or alternatively, the protrusions may form the black-colored portion, as far as the depressions and the protrusions correspond to the pattern).

Figure 4:
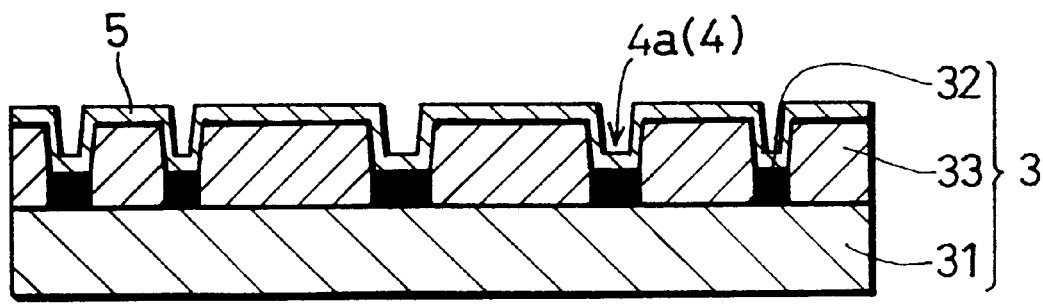
FIG. 4 is a cross-sectional view taken along the line A—A of FIG. 3.

FIG. 4 is a cross-sectional view taken along the line A—A of FIG. 3. On a paper base material 31, an ink layer 32, 32 to be a dark-colored portion of the woodgrain pattern is partially formed. On the remaining portion of the paper base material 31 where no ink layer is formed, a resin layer 33 is formed. The ink layer 32 has a height lower than the resin layer 33 to create depressions 4. On the ink layer 32 and the resin layer 33, a protective layer 5 is formed in such a manner that the protective layer 5 does not completely filling the depressions 4 to leave depressions 4a. The paper base material originally has a color lighter than the ink layer 31, and forms the light-colored portion of the woodgrain pattern. The combination of the ink layer 32 and the paper base material creates the woodgrain pattern shown in FIG. 3 on the decorative paper. It is preferable that the depth of the depressions 4a after the formation of the protective layer 5 is 12 to 14 $\mu$m, because thus-formed decorative paper has a touch close to a natural wood.

In order to prepare the decorative paper having a woodgrain pattern such as shown in FIGS. 3 and 4, the methods disclosed in above-mentioned Japanese Unexamined Patent Publications Nos. 48-674, 48-777, and 63-77571 may be employed. In order to foam and bulge the resin layer, the ink layer is formed using the ink containing a compound which reacts with the curing agent contained in the resin layer to generate gas, or alternatively, the ink layer is formed using the ink containing a compound which is decomposed through the application of heat to generate gas. In accordance with the desired color and pattern of the design, various modifications may be made. For example, a first printing ink layer to be the light-colored portion of the woodgrain pattern is formed, and after that, a second printing ink layer to be the dark-colored portion of the woodgrain pattern is formed (and vice versa). Alternatively, prior to forming the first printing ink layer, a layer printed into a solid color may be formed on the entire surface of the paper base material.

The decorative paper having a three-dimensional pattern is not limited to that shown in FIGS. 3 and 4, but there are also other types of decorative paper employable as "the decorative paper having the depressions and the protrusions corresponding to the pattern". For example, decorative paper is formed with the depressions and the protrusions, but only either of the depressions or the protrusions are colored. Alternatively, decorative paper itself is provided with a pattern using a colorant and the like, and then, the depressions and protrusions corresponding to the pattern are formed.

The paper-laminated metal sheet of the present invention has various applications. Hereinafter, typical applications thereof and the effect obtained through the use thereof will be described.

(A) Use for construction materials

In this application, the paper-laminated metal sheet can be used as construction materials for houses and buildings. Specifically, the paper-laminated metal sheet can be used as inner wall materials, ceiling material, flooring material, interior material, partitioning units, panels, doors, sash, and the like. There are also such applications as metallic parts including hinges and locks. Through the use of the paper-laminated metal sheet for applications where metal plates have been used alone, the following advantages can be obtained:

(1) Whereas metal plates alone have a coolness and a cold touch, the paper-laminated metal sheet has a warmth and a soft touch. At the same time, it has a calm and peaceful appearance;

(2) Due to the excellent aesthetic appearance, the paper-laminated metal sheet is useful as a novel material with high quality appearance unbelievable for a metal sheet;

(3) The paper-laminated metal sheet has high processability and strength derived from the metal base material, and also has high corrosion resistance which is given by the paper and the protective layer;

(4) The paper-laminated metal sheet has higher fireproof property and resistance to spread of fire than paper alone when burned. Even if cigarette fire is pressed to the paper-laminated metal sheet, the metal base material adsorbs the heat of cigarette, and therefore, fire is hard to spread. Even if the paper-laminated metal sheet burns, no harmful gas is generated, unlike the case where polyvinyl chloride steel sheet is burned;

(5) The paper-laminated metal sheet has remarkably higher strength than paper alone; and (6) The protective layer prevents the paper from being torn and contaminated. Therefore, the aesthetic appearance derived from the paper is semipermanently kept.

When the paper-laminated metal sheet is used for decorative laminates such as woody decorative laminates, further advantages are obtained in addition to those described in points (1) to (4), such as high processability and resistance to termite, as well as being recyclable. In addition, when the paper-laminated metal sheet is used for metallic parts, they can be made into the same designs and feelings as those of the main body to which the metallic parts are mounted.

A matching is created between the main body and the metallic parts, causing no mismatching and strangeness therebetween, thereby realizing a design of higher sense.

(B) Use for furniture materials

The paper-laminated metal sheet can be used for all the furniture which has been conventionally made of steel, such as desks, chairs, lockers, cabinets, counters, stands, bookshelves, partitions, and beds. In addition, it is also applicable to furniture which has been conventionally made of woods or resins only. When the paper-laminated metal sheet is used for furniture, the same advantages as those described in the above points (1) to (6) for use in construction materials can be obtained. Furthermore, when the paper-laminated metal sheet is used for metallic parts of furniture, the matching is created between the furniture and the metallic parts with no mismatching and strangeness, thereby realizing a design of higher sense.

(C) Use for casing members of electric appliances

The paper-laminated metal sheet is usable for casing members of electric appliances such as televisions, refrigerators, washing machines, air conditioner, and lightening equipment. Specifically, the paper-laminated metal sheet is usable for casing members of electric applicances which have been conventionally made of metal sheet alone, thereby realizing a design of high sense. When the paper-laminated metal sheet is used for electric appliances, the same advantages as those described in the points (1) to (6) for use in construction materials can be obtained. In addition, it is also applicable as constituent elements for other electric appliances.

The applications of the paper-laminated metal sheet of the present invention is not limited to those described in the above points (A) to (C), but there are also other various applications including, for example, interior materials for vehicles such as cars, trains, and ships, metal parts, and vessels.

EXAMPLES

Hereinafter, the present invention will be further described in detail with reference to examples. However, it is to be noted that various changes and modifications will be apparent to those skilled in the art. Therefore, unless otherwise such change and modifications depart from the scope of the invention, they should be construed as being included therein.

EXAMPLES AND COMPARATIVE EXAMPLES

The metal base materials shown in Tables 1 to 5 were subjected to chromate treatment (Cr:30 mg/m$^2$), and then, an acryl-based pressure sensitive adhesive agent was applied thereon by a roll coating method in such a manner that the weight after being dried was 10 g/m$^2$. After that, the papers (i.e. decorative paper, paper, embossed paper, crape paper, corrugated paper, calendered paper, and colored polyvinyl chloride film) were respectively laminated on the metal base materials via the adhesive agent layer, and were dried at 80° C. (metal sheet temperature) for 1 minute. Then, the resins shown in Tables 1 to 5 were respectively applied on the paper, and were dried to form protective layers. In Tables 1 to 5, the thickness ($\mu$m) means the thickness of the protective layer after being dried. As a result, paper-laminated metal sheets were obtained. The characteristics of the paper-laminated metal sheets were evaluated by the following methods. The evaluation results are shown in Tables 1 to 5.

All the metal base materials had a thickness of 0.3 mm except for the aluminum foil used in Example No. 36. The aluminum foil used in Example No. 36 had a thickness of 15 $\mu$m. The decorative paper had a basis weight of 50 g/m$^2$ and was formed with a three-dimensional woodgrain pattern. In Comparative Examples 44 to 47, the paper had a breaking strength larger than the peel strength between the paper and the metal base material. In Comparative Examples 48 to 49, the peel strength of the paper and the metal base material was smaller than the preferable value defined in the present invention. In Comparative Examples 57 to 60, the maximum elongation of the paper did not fall within the preferable range defined in the present invention. In Comparative Example 56, a plywood veneer board was used instead of a metal base material.

Method for evaluating the characteristics

Contact Angle with Water

The contact angle with water was obtained by a liquid drop method in which water droplets were made on the protective layer, and the contact angle with the water droplets was measured at an atmosphere temperature of 23° C. using a CD-DT . A-type contact angle meter manufactured by Kyowa Kaimen Kagaku Co., Ltd.

Peel Strength at 180 Degree

The peel strength at 180 degree (kgf/10 mm in width) was measured in conformance with Japanese Industrial Standards (JIS) Z 0 237. Specifically, the metal base material and the paper (10 mm in width) laminated on the metal base material were pinched with the upper and lower chucks respectively. The resistance force obtained by peeling off at a speed of 200 mm/min was measured. The measurement was conducted at an atmosphere temperature of 23° C. and humidity of 80%.

Breaking Strength and Elongation of Paper

The breaking strength (kgf/10 mm in width) and the maximum elongation (%) of the paper itself were the values obtained when the sample piece paper was tensed at a speed of 1 mm/min. The measurement was conducted at an atmosphere temperature of 23° C. and humidity of 80%.

Processability-1

The bending test at 90 degree was conducted at R:1 mm. The breaking (i.e. cracking) state and the peeling state of the paper at the bent portion were visually observed, and were evaluated under the following standards.

⊚: No cracks were observed.

○: Small number of cracks were observed.

Δ: A large number of cracks were observed.

×: Bending test could not be conducted.

Processability-2

The bending test at 180 degree was conducted. The breaking state and the peeling state of the paper at the bent portion were visually observed, and were evaluated under the same standards as used in the evaluation of the processability-1.

Adhesiveness

The peel strength at 180 degree (kgf/10 mm in width) between the paper and the metal base material was measured, and was evaluated under the following standards.

⊚: The peel strength at 180 degree was 0.01 or more.

○: The peel strength at 180 degree was larger than 0.008 to smaller than 0.01.

Δ: The peel strength at 180 degree was larger than 0.005 to 0.008.

×: The peel strength at 180 degree was 0.005 or smaller.

Aesthetic Appearance

Whether or not the respective paper-laminated metal sheets had the aesthetic appearance under the following standards.

⊚: Paper having high aesthetic appearance was laminated on the metal base material.

Δ: A colored polyvinyl chloride film was laminated on the metal base material.

×: Nothing was laminated on the metal base material.

Safety

The materials other than the metal base material (i.e. an adhesive agent, paper, a colored polyvinyl chloride film, and a protective layer) were put into a tube furnace, and were heated at about 700° C. to be burn. The generated gas was trapped in a cold trap tube, and then was put into a tedler bag. The gas was analyzed by a gas chromatography, and was evaluated under the following standard.

○: No harmful gas (chlorine-containing gas) was generated (at the level of 30 μg per 1 g of sample piece).

×: Harmful gas was generated (at the level of 3000000 μg per 1 g of sample piece).

Chemical Resistance

Onto the protective layer, 5% acetic acid aqueous solution and 1% sodium hydroxide aqueous solution were respectively dropped. Then, the protective layer was covered with a watch glass. After 24 hours, the 5% acetic acid aqueous solution and 1% sodium hydroxide aqueous solution were wiped out. The state of the surface of the protective layer was visually observed, and was evaluated under the following standards.

⊚: There was no change in the color of the surface.

○: The color of the surface was slightly changed or degraded.

Δ: The color of the surface was remarkably changed or degraded.

×: The color of the surface was seriously changed or degraded.

Contamination Resistance

Onto the protective layer, oily marking ink of an oil magic marker and soy source were respectively dropped. Then, the protective layer was covered with a watch glass. After 24 hours, the ink and the soy source were wiped out. The state of the surface of the protective layer was visually observed, and was evaluated under the following standards.

⊚: No contamination was observed.

○: A slight contamination was observed.

Δ: A remarkable contamination was observed.

×: A serious contamination was observed.

Resistance to Spread of Fire

The resistance of spread of fire was measured by a self-extinguishing characteristics test in conformance with Japanese Industrial Standards K 6744, and was evaluated under the following standards.

⊚: Fire extinguished immediately.

○: Fire extinguished within 5 seconds.

Δ: Fire extinguished within 10 seconds.

×: Fire extinguished in 10 seconds or longer.

The meanings of the abbreviations in Tables 1 to 5 are as follows.

PU: polyurethane resin

EPO: epoxy resin

UPE: polyester resin

AL: alkyd resin

SB: styrene-butadiene copolymer

VA: vinyl acetate resin

PVC: polyvinyl chloride

The unit of the peel strength at 180 degree and the breaking strength of the paper is kgf/10 mm in width.

TABLE 1-1

| | Metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| EXAMPLE | | | | | | | | | | | | | | | |
| 1 | Fused Zn-plated steel sheet | Decorative paper | PU:20 | 105 | 1.5 | 5.0 | 4.5 | ⊚ | ⊚ | ⊚ | ⊚ | ○ | ⊚ | ⊚ | ⊚ |

TABLE 1-1-continued

| | Metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| 2 | Fused Zn-plated steel sheet | Decorative paper | PU:20 | 105 | 2.0 | 5.0 | 4.5 | ◉ | ◉ | ◉ | ◉ | ◉ | ◉ | ◉ | ◉ |
| 3 | Fused Zn-plated steel sheet | Decorative paper | PU:20 | 105 | 3.0 | 5.0 | 4.5 | ◉ | ◉ | ◉ | ◉ | ◉ | ◉ | ◉ | ◉ |
| 4 | Fused Zn-plated steel sheet | Decorative paper | PU:20 | 105 | 1.0 | 5.0 | 4.5 | ◉ | ◉ | ◉ | ◉ | ◉ | ◉ | ◉ | ◉ |
| 5 | Fused Zn-plated steel sheet | Decorative paper | PU:20 | 105 | 0.5 | 5.0 | 4.5 | ◉ | ◉ | ◉ | ◉ | ◉ | ◉ | ◉ | ◉ |
| 6 | Fused Zn-plated steel sheet | Decorative paper | PU:20 | 105 | 0.1 | 5.0 | 4.5 | ◉ | ◉ | ◉ | ◉ | ◉ | ◉ | ◉ | ◉ |
| 7 | Fused Zn-plated steel sheet | Decorative paper | PU:20 | 105 | 0.05 | 5.0 | 4.5 | ◉ | ◉ | ◉ | ◉ | ◉ | ◉ | ◉ | ◉ |

TABLE 1-2

| | metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| EXAMPLE | | | | | | | | | | | | | | | |
| 8 | Fused Zn-plated steel sheet | Decorative paper | PU:20 | 105 | 0.01 | 5.0 | 4.5 | ◉ | ◉ | ◉ | ◉ | ◉ | ◉ | ◉ | ◉ |
| 9 | Fused Zn-plated steel sheet | Decorative paper | PU:20 | 105 | 1.5 | 4.0 | 4.5 | ◉ | ◉ | ◉ | ◉ | ◉ | ◉ | ◉ | ◉ |
| 10 | Fused Zn-plated steel sheet | Decorative paper | PU:20 | 105 | 1.5 | 3.0 | 4.5 | ◉ | ◉ | ◉ | ◉ | ◉ | ◉ | ◉ | ◉ |
| 11 | Fused Zn-plated steel sheet | Decorative paper | PU:20 | 105 | 1.5 | 2.0 | 4.5 | ◉ | ◉ | ◉ | ◉ | ◉ | ◉ | ◉ | ◉ |

TABLE 1-2-continued

| | metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| 12 | Fused Zn-plated steel sheet | Decorative paper | PU:20 | 105 | 1.5 | 5.0 | 4.0 | ⊙ | ⊙ | ⊙ | ⊙ | ⊙ | ⊙ | ⊙ | ⊙ |
| 13 | Fused Zn-plated steel sheet | Decorative paper | PU:20 | 105 | 1.5 | 5.0 | 3.0 | ⊙ | ⊙ | ⊙ | ⊙ | ⊙ | ⊙ | ⊙ | ⊙ |
| 14 | Fused Zn-plated steel sheet | Decorative paper | PU:20 | 105 | 1.5 | 5.0 | 2.0 | ⊙ | ⊙ | ⊙ | ⊙ | ⊙ | ⊙ | ⊙ | ⊙ |

TABLE 2-1

| | Metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| EXAMPLE | | | | | | | | | | | | | | | |
| 15 | Fused Zn-plated steel sheet | Decorative paper | PU:20 | 105 | 1.5 | 5.0 | 6.0 | ⊙ | ⊙ | ⊙ | ⊙ | ⊙ | ⊙ | ⊙ | ⊙ |
| 16 | Fused Zn-plated steel sheet | Decorative paper | PU:5 | 90 | 1.5 | 5.0 | 4.5 | ⊙ | ⊙ | ⊙ | ⊙ | ⊙ | ⊙ | ⊙ | ⊙ |
| 17 | Fused Zn-plated steel sheet | Decorative paper | PU:10 | 100 | 1.5 | 5.0 | 4.5 | ⊙ | ⊙ | ⊙ | ⊙ | ⊙ | ⊙ | ⊙ | ⊙ |
| 18 | Fused Zn-plated steel sheet | Decorative paper | PU:15 | 103 | 1.5 | 5.0 | 4.5 | ⊙ | ⊙ | ⊙ | ⊙ | ⊙ | ⊙ | ⊙ | ⊙ |
| 19 | Fused Zn-plated steel sheet | Decorative paper | PU:30 | 110 | 1.5 | 5.0 | 4.5 | ⊙ | ⊙ | ⊙ | ⊙ | ⊙ | ⊙ | ⊙ | ⊙ |
| 20 | Fused Zn-plated steel sheet | Decorative paper | PU:40 | 113 | 1.5 | 5.0 | 4.5 | ⊙ | ⊙ | ⊙ | ⊙ | ⊙ | ⊙ | ⊙ | ⊙ |
| 21 | Fused Zn-plated steel sheet | Decorative paper | AR:20 | 103 | 1.5 | 5.0 | 4.5 | ⊙ | ⊙ | ⊙ | ⊙ | ⊙ | ⊙ | ⊙ | ⊙ |

TABLE 2-2

| | Metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| EXAMPLE | | | | | | | | | | | | | | | |
| 22 | Fused Zn-plated steel sheet | Decorative paper | EPO:20 | 100 | 1.5 | 5.0 | 4.5 | ⊚ | ⊚ | ⊚ | ⊚ | ⊚ | ⊚ | ⊚ | ⊚ |
| 23 | Fused Zn-plated steel sheet | Decorative paper | UPE:20 | 102 | 1.5 | 5.0 | 4.5 | ⊚ | ⊚ | ⊚ | ⊚ | ⊚ | ⊚ | ⊚ | ⊚ |
| 24 | Fused Zn-plated steel sheet | Decorative paper | AL:20 | 80 | 1.5 | 5.0 | 4.5 | ⊚ | ⊚ | ⊚ | ⊚ | ⊚ | ⊚ | ⊚ | ⊚ |
| 25 | Fused Zn-plated steel sheet | Decorative paper | SB:20 | 60 | 1.5 | 5.0 | 4.5 | ⊚ | ⊚ | ⊚ | ⊚ | ⊚ | ⊚ | ⊚ | ⊚ |
| 26 | Fused Zn-plated steal sheet | Decorative paper | VA:20 | 100 | 1.5 | 5.0 | 4.5 | ⊚ | ⊚ | ⊚ | ⊚ | ⊚ | ⊚ | ⊚ | ⊚ |
| 27 | Electric Zn-plated steel sheet | Decorative paper | PU:20 | 105 | 1.5 | 5.0 | 4.5 | ⊚ | ⊚ | ⊚ | ⊚ | ⊚ | ⊚ | ⊚ | ⊚ |
| 28 | Electric Zn—Ni plated steel sheet | Decorative paper | PU:20 | 105 | 1.5 | 5.0 | 4.5 | ⊚ | ⊚ | ⊚ | ⊚ | ⊚ | ⊚ | ⊚ | ⊚ |

TABLE 3-1

| | Metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| EXAMPLE | | | | | | | | | | | | | | | |
| 29 | Alloyed fused Zn-plated steel sheet | Decorative paper | PU:20 | 105 | 1.5 | 5.0 | 4.5 | ⊚ | ⊚ | ⊚ | ⊚ | ⊚ | ⊚ | ⊚ | ⊚ |
| 30 | Fused Al-plated steel sheet | Decorative paper | PU:20 | 100 | 1.5 | 5.0 | 4.5 | ⊚ | ⊚ | ⊚ | ⊚ | ⊚ | ⊚ | ⊚ | ⊚ |
| 31 | Fused Zn—Al (55) | Decorative | PU:20 | 105 | 1.5 | 5.0 | 4.5 | ⊚ | ⊚ | ⊚ | ⊚ | ⊚ | ⊚ | ⊚ | ⊚ |

TABLE 3-1-continued

| | Metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| | plated steel sheet | paper | | | | | | | | | | | | | |
| 32 | Fused Zn—Al (5) plated steel | Decorative paper | PU:20 | 105 | 1.5 | 5.0 | 4.5 | ◉ | ◉ | ◉ | ◉ | ◉ | ◉ | ◉ | ◉ |
| | | sheet | | | | | | | | | | | | | |
| 33 | Cold stretched steel plate | Decorative paper | PU:20 | 105 | 1.5 | 5.0 | 4.5 | ◉ | ◉ | ◉ | ◉ | ◉ | ◉ | ◉ | ◉ |
| 34 | Heat stretched sheet steel | Decorative paper | PU:20 | 105 | 1.5 | 5.0 | 4.5 | ◉ | ◉ | ◉ | ◉ | ◉ | ◉ | ◉ | ◉ |
| 35 | Al sheet | Decorative paper | PU:20 | 105 | 1.5 | 5.0 | 4.5 | ◉ | ◉ | ◉ | ◉ | ◉ | ◉ | ◉ | ◉ |

TABLE 3-2

| | Metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| EXAMPLE | | | | | | | | | | | | | | | |
| 36 | Al foil | Decorative paper | PU:20 | 105 | 1.5 | 5.0 | 4.5 | ◉ | ◉ | ◉ | ◉ | ◉ | ◉ | ◉ | ◉ |
| 37 | Cu sheet | Decorative paper | PU:20 | 105 | 1.5 | 5.0 | 4.5 | ◉ | ◉ | ◉ | ◉ | ◉ | ◉ | ◉ | ◉ |
| 38 | Ti sheet | Decorative paper | PU:20 | 105 | 1.5 | 5.0 | 4.5 | ◉ | ◉ | ◉ | ◉ | ◉ | ◉ | ◉ | ◉ |
| 39 | Fused Zn-plated steel sheet | Paper | PU:20 | 105 | 1.5 | 5.0 | 4.5 | ◉ | ◉ | ◉ | ◉ | ◉ | ◉ | ◉ | ◉ |

TABLE 4-1

| | Metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| EXAMPLE | | | | | | | | | | | | | | | |
| 40 | Fused Zn-plated steel sheet | Embossed paper | PU:20 | 105 | 1.5 | 5.0 | 4.5 | ◉ | ◉ | ◉ | ◉ | ◉ | ◉ | ◉ | ◉ |
| 41 | Fused Zn-plated steel sheet | Crape paper | PU:20 | 105 | 1.5 | 5.0 | 4.5 | ◉ | ◉ | ◉ | ◉ | ◉ | ◉ | ◉ | ◉ |
| 42 | Fused Zn-plated steel sheet | Corrugated paper | PU:20 | 105 | 1.5 | 5.0 | 4.5 | ◉ | ◉ | ◉ | ◉ | ◉ | ◉ | ◉ | ◉ |
| 43 | Fused Zn-plated steel sheet | Calendered paper | PU:20 | 105 | 1.5 | 5.0 | 4.5 | ◉ | ◉ | ◉ | ◉ | ◉ | ◉ | ◉ | ◉ |
| COMPARATIVE EXAMPLE | | | | | | | | | | | | | | | |
| 44 | Fused Zn-plated steel sheet | Decorative paper | PU:20 | 105 | 1.5 | 1.3 | 4.5 | Δ | X | ◉ | ◉ | ◉ | ◉ | ◉ | ◉ |
| 45 | Fused Zn-plated steel sheet | Decorative paper | PU:20 | 105 | 2.0 | 1.5 | 4.5 | Δ | X | ◉ | ◉ | ◉ | ◉ | ◉ | ◉ |

TABLE 4-2

| | metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| COMPARATIVE EXAMPLE | | | | | | | | | | | | | | | |
| 46 | Fused Zn-plated steel sheet | Decorative paper | PU:20 | 105 | 3.0 | 2.0 | 4.5 | X | X | ◉ | ◉ | ◉ | ◉ | ◉ | ◉ |
| 47 | Fused Zn- | Decorative | PU:20 | 105 | 0.5 | 0.4 | 4.5 | X | X | ◉ | ◉ | ◉ | ◉ | ◉ | ◉ |

TABLE 4-2-continued

| | metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| | plated steel sheet | paper | | | | | | | | | | | | | |
| 48 | Fused Zn-plated steel sheet | Decorative paper | PU:20 | 105 | 0.008 | 5.0 | 4.5 | ◉ | ◉ | Δ | ○ | ◉ | ◉ | ◉ | ◉ |
| 49 | Fused Zn-plated steel sheet | Decorative paper | PU:20 | 105 | 0.005 | 5.0 | 4.5 | ◉ | ◉ | X | ◉ | ◉ | ◉ | ◉ | ◉ |

TABLE 5-1

| | Metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| COMPARATIVE EXAMPLE | | | | | | | | | | | | | | | |
| 50 | Fused Zn-plated steel sheet | Decorative paper | PU:20 | 105 | 1.5 | 5.0 | 1.8 | X | X | ◉ | ◉ | ◉ | ◉ | ◉ | ◉ |
| 51 | Fused Zn-plated steel sheet | Decorative paper | PU:20 | 105 | 1.5 | 5.0 | 1.5 | X | X | ◉ | ◉ | ◉ | ◉ | ◉ | ◉ |
| 52 | Fused Zn-plated steel sheet | Decorative paper | PU:20 | 105 | 1.5 | 5.0 | 1.0 | X | X | ◉ | ◉ | ◉ | ◉ | ◉ | ◉ |
| 53 | Electric Zn-plated steel sheet | PVC | — | — | — | — | — | ◉ | ◉ | ◉ | Δ | X | ○ | Δ | Δ |
| 54 | Fused Zn-plated steel sheet | PVC | — | — | — | — | — | ◉ | ◉ | ◉ | Δ | X | ○ | Δ | Δ |
| 55 | Electric Zn-plated steel sheet | None | — | — | — | — | — | ◉ | ◉ | ◉ | X | ◉ | X | X | ◉ |

TABLE 5-2

| | metal base material | Paper | Kind & thickness of protective layer (μm) | Contact angle with water (°) | Peel strength at 180 degree* | Breaking strength of paper* | Elongation of paper (%) | Processability-1 | Processability-2 | Adhesiveness | Aesthetic appearance | Safety | Chemical resistance | Contamination resistance | Resistance to spread of fire |
|---|---|---|---|---|---|---|---|---|---|---|---|---|---|---|---|
| COMPARATIVE EXAMPLE | | | | | | | | | | | | | | | |
| 56 | Plywood | Decorative paper | PU:20 | 105 | 1.5 | 5.0 | 4.5 | X | X | ⊚ | ⊚ | ⊚ | ⊚ | ⊚ | X |
| 57 | Fused Zn-plated steel sheet | Decorative paper | PU:4 | 105 | 1.5 | 4.0 | 1.8 | X | X | ⊚ | ⊚ | ⊚ | Δ | Δ | |
| 58 | Fused Zn-plated steel sheet | Decorative paper | PU:2 | 105 | 1.5 | 3.0 | 1.5 | X | X | ⊚ | ⊚ | ⊚ | X | X | ⊚ |
| 59 | Fused Zn-plated steel sheet | Decorative paper | PU:1 | 105 | 1.5 | 2.0 | 1.2 | X | X | ⊚ | ⊚ | ⊚ | X | X | ⊚ |
| 60 | Fused Zn-plated steel sheet | Decorative paper | — | 105 | 1.5 | 2.0 | 1.2 | X | X | ⊚ | ⊚ | ⊚ | X | X | ⊚ |

INDUSTRIAL APPLICABILITY

According to the present invention, the paper-laminated metal sheet has a structure in which the paper is laminated on at least one side of the metal sheet, and then the protective layer is formed on the paper. This structure is simple, but has advantages that the aesthetic appearance of the paper is imparted to the metal sheet. Thus-formed paper-laminated metal sheet has high strength and durability derived from the metal base material as well as the warm touch derived from the paper, while eliminating a coolness and cold touch of metals. In addition, the protective layer prevents the paper from being damaged during the time when the paper-laminated metal sheet is processed or is used for products. In addition, when the paper printed beforehand is used, higher aesthetic appearance is attained. For example, when paper printed with a woodgrain pattern is used, the paper-laminated metal sheet is valuable in various applications as a novel material with high quality appearance.

The paper-laminated metal sheet is useful in not only applications where metal sheets and painted metal sheets have been conventionally used, but also in applications where only wood materials such as plywood and resin materials have been used. Examples of such applications include: construction materials such as inner wall materials, floor materials, ceiling materials, interior materials, panels, and doors; furniture such as lockers, cabinets, and counters; casing members for electric appliances; and interior materials for vehicles such as cars, train, and ships. The paper-laminated metal sheet is also applicable as a material for vessels and metallic parts.

What is claimed is:

1. A paper-laminated metal sheet comprising a metal base material, a pressure sensitive adhesive agent layer or an adhesive agent layer, a paper, and a protective layer, wherein at least a sheet of the paper is formed on at least one side of the metal base material via the pressure sensitive adhesive agent layer or adhesive agent layer, and the protective layer is formed on the top surface of the paper-laminated side of the paper-laminated metal sheet, and a peel strength at 180 degrees between the metal base material and the paper laminated thereon is in the range between 0.01 and 5.0 kgf/10 mm in width, and the peel strength is smaller than a breaking strength of the paper itself.

2. A paper-laminated metal sheet according to claim 1, wherein the protective layer is a water-repellant film made of other than resins containing chlorine atoms.

3. A paper-laminated metal sheet according to claim 1, wherein the protective layer is a resin film having a water contact angle of 60 degree or more measured by a liquid drop method at 23° C.

4. A paper-laminated metal sheet according to claim 1, wherein the paper has a maximum elongation of 2% or more.

5. A paper-laminated metal sheet according to claim 1, wherein the paper is decorative paper having depressions and/or protrusions on its surface, and the depressions and/or the protrusions have a color different from the surrounding portions to form a visually recognizable design.

6. A paper-laminated metal sheet according to claim 5, wherein the decorative paper comprises at least a paper base material, a printing ink layer, and a resin layer, and the resin layer has depressions and/or protrusions therein.

7. A paper-laminated metal sheet according to claim 5, wherein the decorative paper has a woodgrain pattern.

8. A paper-laminated metal sheet according to claim 7, wherein the resin layer of the decorative paper has depressions corresponded to dark-colored portions of the woodgrain pattern.

9. A paper-laminated metal sheet according to claim 7, wherein the decorative paper comprises:

a first printing ink layer to be light-colored portions of the woodgrain pattern, the first printing ink layer being formed on the entire surface of the paper base material directly or via another layer;

a second printing ink layer to be dark-colored portions of the woodgrain pattern on the first printing ink layer; and a resin layer formed on the first printing ink layer and the second printing ink layer, the resin layer including a curing agent, and the second ink layer being formed using ink including a compound which generates gas through the reaction with the curing agent included in the resin layer, the generated gas creates bubbles at least in the resin layer positioned on the second printing ink layer to foam and bulge the resin layer, and then a whole of the foamed portions are ground to form depressions in the resin layer of which bottoms correspond to the top surface of the second printing ink layer.

10. A paper-laminated metal sheet according to claim 7, wherein the decorative paper comprises:

a first printing ink layer to be light-colored portions of the woodgrain pattern, the first printing ink layer being formed on the entire surface of the paper base material directly or via another layer;

a second printing ink layer to be dark-colored portions of the woodgrain pattern on the first printing ink layer; and a resin layer formed on the first printing ink layer and the second printing ink layer, the resin layer including a curing agent, and the second ink layer being formed using ink including a compound which generates gas through the application of heart, the generated gas creates bubbles at least in the resin layer positioned on the second printing ink layer to foam and bulge the resin layer, and then a whole of the foamed portions are ground to form depressions in the resin layer of which bottoms corresponded to the top surface of the second printing ink layer.

11. A paper-laminated metal sheet according to claim 1, for use in construction materials, furniture and casing members of electric appliances, and interior materials for cars, trains, and ships.

* * * * *

UNITED STATES PATENT AND TRADEMARK OFFICE
CERTIFICATE OF CORRECTION

PATENT NO. : 6,277,468 B1
DATED : August 21, 2001
INVENTOR(S) : Nakamoto et al.

It is certified that error appears in the above-identified patent and that said Letters Patent is hereby corrected as shown below:

<u>Title page,</u>
Item [75], the inventors information should read:

-- [75] Inventors: Tadashige Nakamoto; Hideki Nakamura, both of Kakogawa-shi; Takeshi Kii; Noboru Kishida, both of Chiyoda-ku; Koji Ishimoto, Kitakyushu-shi; Mitsuo Ikeda, Souwa-machi, all of (JP) --

Signed and Sealed this

Ninth Day of April, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,277,468 B1  Page 1 of 1
DATED : August 21, 2001
INVENTOR(S) : Nakamoto et al.

It is certified that error appears in the above-identified patent and that said Letters Patent is hereby corrected as shown below:

<u>Title page,</u>
Item [73], the Assignee information should read:
-- [73]  Assignees: Kabushiki Kaisha Kobe Seiko Sho, Kobe-shi; Mitsui Bussan Construction Materials Co., Ltd., Mitsui & Co., Ltd., both of Chiyoda-ku; Dantani Corporation, Kitakyushu-shi; Tokyo Color Gravure Industrial Co., Ltd., Sashima-gun, all of (JP) --

Signed and Sealed this

Twenty-first Day of January, 2003

JAMES E. ROGAN
*Director of the United States Patent and Trademark Office*